March 29, 1966     R. M. CARSON     3,243,202

WIDE-RANGE TOW HITCH TO FACILITATE CONNECTION

Filed Oct. 21, 1963     2 Sheets-Sheet 1

Raymond M. Carson
INVENTOR.

BY *Clarence A. O'Brien*
*and Harvey B. Jacobson*
Attorneys

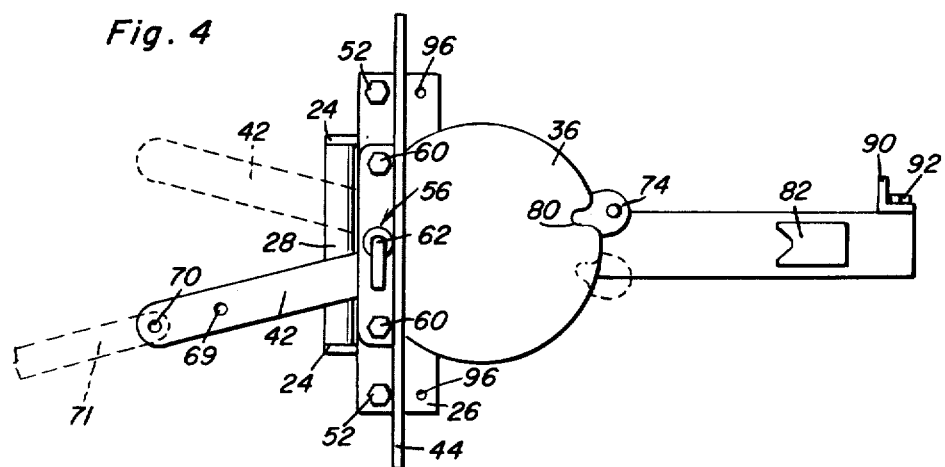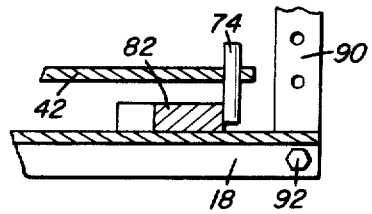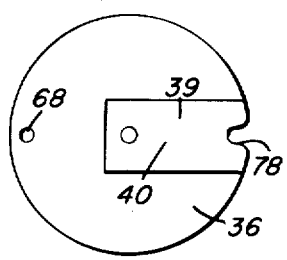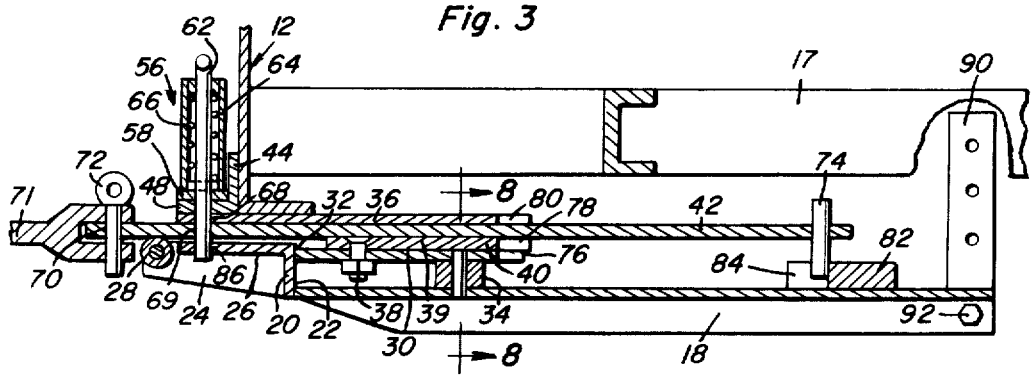
Raymond M. Carson
INVENTOR.

United States Patent Office 3,243,202
Patented Mar. 29, 1966

3,243,202
WIDE-RANGE TOW HITCH TO FACILITATE
CONNECTION
Raymond M. Carson, Rte. 1, Faxon, Okla.
Filed Oct. 21, 1963, Ser. No. 317,689
6 Claims. (Cl. 280—478)

This invention relates to a novel and useful wide-range tow hitch and more specifically to a tow hitch which will enable a towing vehicle to which the hitch is secured to be placed in close proximity with the vehicle which is to be towed, the tow hitch then being operable, by means of a hitch arm swingable about a vertical axis and extendible radially of that axis, to operatively couple the towing vehicle to the vehicle which is to be towed.

The wide-range hitch of the instant invention further includes means whereby the arm may be automatically locked in a predetermined position of rotation about its axis upon movement of the arm to that position and by which the extendible arm may be automatically secured in a retracted position upon movement of the arm toward its retracted position. In this manner, with the arm of hitch extended and free to pivot about a vertical axis the free end of the arm may be coupled to the towed vehicle. Thereafter, the towing vehicle may proceed forwardly and in a direction to swing the arm to its predetermined position of rotation whereupon the arm will be locked in that position of rotation. Then, the towing vehicle may be stopped and backed toward the vehicle which is to be towed in order to retract the extendible and swingable hitch arm. As soon as the hitch arm has been moved to its retracted position it will be automatically locked in that position and the hitch arm will therefore be locked in a fixed position relative to the towing vehicle for proper towing of the vehicle which is to be towed.

The main object of this invention is to provide a wide-range tow hitch that will enable a towing vehicle to be operatively connected to a vehicle which is to be towed without precisely positioning the towing vehicle relative to the trailed vehicle.

Another object of this invention is to provide a wide-range tow hitch including means by which the movable portion of the tow hitch which is secured to the towing vehicle may be automatically locked in its proper position for towing a vehicle upon forward movement of the towing vehicle after the latter has been hitched to the trailed vehicle and subsequent for shortening of the distance between the towing and trailed vehicles.

A final object of this invention to be specifically enumerated herein is to provide a wide-range tow hitch in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a longitudinal vertical sectional view of the tow hitch taken substantially upon a plane indicated by the section line 3—3 of FIGURE 2 and with the associated portions of the towing vehicle illustrated in their proper positions an also in vertical section;

FIGURE 4 is a further top plan view of the wide-range tow hitch but with the elongated hitch bar or arm of the hitch in an extended rotated position, a second extended rotated position of the hitch bar being illustrated in phantom lines;

FIGURE 5 is a bottom plan view of the pivotally mounted base of the tow hitch;

FIGURE 6 is a fragmentary enlarged longitudinal vertical sectional view of the rear end of the tow hitch with the hitch bar being illustrated in the fully retracted position;

Figure 1:
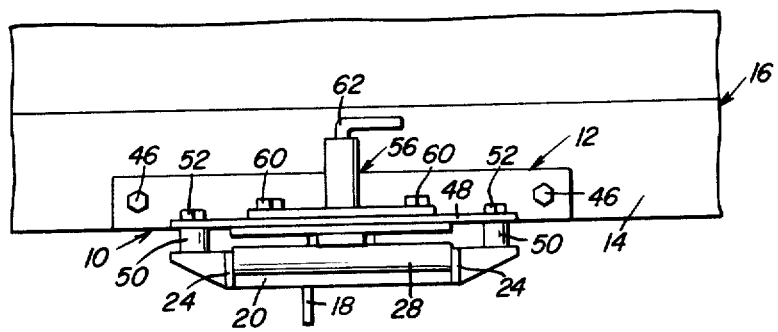
FIGURE 1 is a fragmentary rear elevational view of a towing vehicle shown with the tow hitch of the instant invention operatively mounted thereon.
Figure 2:
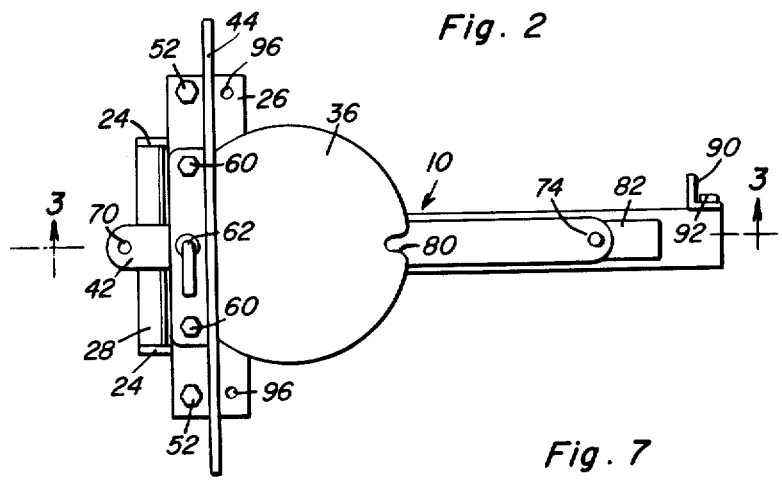
FIGURE 2 is a top plan view of the tow hitch of the instant invention.
Figure 8:
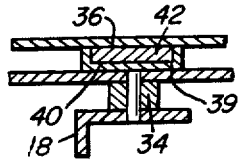
FIGURE 8 is a fragmentary transverse vertical sectional view taken substantially upon the plane indicated by the section line 8—8 of FIGURE 3.
Figure 7:
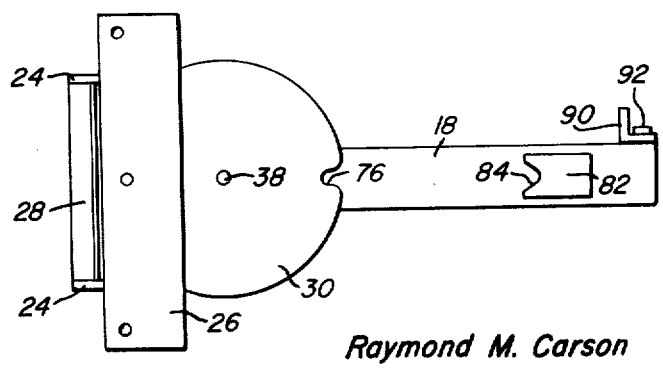
FIGURE 7 is a top plan view of the frame of the tow hitch having the base rotatably mounted thereon and with the lock means and the elongated hitch bar removed.

Referring now more specifically to the drawings the numeral 10 generally designates the wide-range hitch of the instant invention. The hitch 10 includes a main frame generally referred to by the reference numeral 12 which is secured to the rear bumper 14 of a vehicle generally referred to by the reference numeral 16. In addition, the frame 12 is also secured to a frame member 17 of the vehicle 16.

The frame 12 includes a longitudinal angle iron 18 to whose rear end a transversely extending angle bracket 20 is secured in any convenient manner such as by welding 22. The angle bracket 20 includes a pair of buttresses 24 which project rearwardly of the horizontal flange 26 of the angle bracket 20 and have a roller 28 rotatably journaled therebetween. A partial circular plate 30 is flattened along one edge portion and secured along that edge portion to the angle bracket 20 in any convenient manner such as by welding 32. The forward end of the mounting plate 30 is disposed in spaced relation relative to the angle iron 18 and is secured thereto by means of a spacer 34.

A circular mounting plate 36 is provided and is pivotally secured to the partially circular mounting plate 30 by means of a pivot fastener 38. The pivot fastener 38 is secured through the bight portion 39 of an upwardly opening channel section 40 secured to the undersurface of the circular mouting plate 36. The top of the pivot fastener 38 is recessed in the upper surface of the bight portion 39 so as not to project into the passageway defined by the channel section.

An elongated hitch bar 42 is slidably received through the passage defined by the channel section 40 immediately beneath the circular mounting plate 36 and is guided for longitudinal reciprocal movement by the channel section 40. In addition, it will be noted that the longitudinal centerline of the channel section 40 intersects the axis of rotation of the circular mounting plate 36 and therefore that the hitch bar 42 is mounted for longitudinal reciprocation along the radius of the axis of rotation of the circular mounting plate 36.

A mounting flange 44 is secured to the rear surface of the bumper 12 in any convenient manner such as by fasteners 46 and includes a rearwardly projecting horizontal flange 48 from which the angle bracket 20 is dependingly supported by means of spacers 50 and suitable fasteners 52. The spacing between the horizontal flange 48 and the horizontal flange 26 of the angle bracket 20 is aligned with the passageway defined by the channel section 40 and accordingly it may be seen that the hitch bar 42 may be extended outwardly and rearwardly through the slot defined between the spacers 50 and the flanges 26 and 48.

A spring detent assembly generally referred to by the reference numeral 56 includes a mounting plate 58 which is secured to the upper surface of the flange 48 in any convenient manner such as by fasteners 60. The detent assembly 56 includes a detent pin 62 which is spring-urged downwardly in a housing 64 by means of a compression spring 66 disposed between the top wall of the housing 64 through which the pin projects and a radially projecting abutment carried by the pin 62.

At one point about the periphery of the circular mounting plate 36 there is provided an aperture 68 which is registrable with the bottom of the pin 62 for receiving the latter therethrough. In addition, the hitch bar 42 includes a bore 69 which, when the aperture 68 is aligned with the pin 62, may also be aligned with the pin 62 upon movement of the hitch bar 42 to a first forwardly disposed retracted position illustrated in FIGURE 3 of the drawings. In addition, the hitch bar 42 includes a second aperture 70 by means of which the forward end of the tongue 71 of a towing vehicle may be secured to the hitch bar 42 by means of a pivot pin 72.

The forward end of the hitch bar 42 includes a vertical pin 74 which projects both above and below the bar 42 and it will be noted that the forward end of the partial circular mounting plate 30 is provided with a notch 76. The forward end of the bight portion 40 is also provided with a notch 78 which is registered with the notch 76 and the notches 76 and 78 are adapted to receive the depending portion of the pin 74 when the hitch bar 42 is in its rearmost extended position.

The peripheral portion of the circular disc 36 diametrically opposite from the aperture 68 is also provided with a radially outwardly opening notch 80 which may be registered with the notches 76 and 78 and is adapted to receive the upwardly projecting portion of the pin 74 when the hitch bar 42 is in its rearmost extended position.

With attention now directed to FIGURE 3 of the drawings it may be seen that an abutment block 82 which defines a rearwardly opening notch 84 is secured to the upper surface of the angle iron 18 and is spaced forwardly of the mounting plates 30 and 36 a distance adapted to seatingly receive the depending portion of the pin 74 when the hitch bar 42 is in the first operative retracted position illustrated in FIGURE 3 of the drawings. The notch 84 therefore also coacts with the depending portion of the pin 74 to prevent rotation of the circular mounting disc 36 relative to the frame 12.

However, it will be noted that the detent pin 62 can be withdrawn from the aperture 68, the bore 69, and the aperture 86 formed in the flange 26. Thereafter the bar 42 may be shifted slightly rearwardly to unseat the pin 74 from the notch 84 and then the circular mounting plate 36 may be rotated about its axis of rotation to swing pin 84 to one side of the block 82. Then the hitch bar may be moved forwardly or to the right as viewed in FIGURE 6 of the drawings a sufficient distance to place the pin 74 forwardly of the block or abutment 82. Then, the circular mounting plate 36 may be rotated to swing the hitch bar 42 to its centered position whereupon the pin 74 will be positioned directly forward of the block 82 and the pin 62 will drop through the aperture 68, the bore 70 and the aperture 86 thus locking the hitch bar 42 in a fully retracted out-of-the-way position with the rear end of the bar 42 adjacent the rear edge of the flange 48.

When it is desired to use the tow hitch, the pin 62 is first retracted whereupon the hitch bar 42 may be extended while the rear end thereof is rollingly supported by the roller 28 and the mounting plate 36 may be rotated so as to position the hitch bar 42 in a position such as that illustrated in FIGURE 4 of the drawings. Then, the rear end of the hitch bar 42 may be pinned to the tongue 71 as illustrated in FIGURE 3 of the drawings. Thereafter, the towing vehicle 16 may move forward a sufficient distance to enable the hitch bar 42 to be swung to the centered position whereupon the pin 62 will fall through the aperture 68 to lock the bar 42 in the centered position. Then, the distance between the towing vehicle 16 and the trailer vehicle may be decreased so as to urge the tow bar 42 forwardly through the channel section 40 until such time as the pin 62 drops through the bore 69 and the aperture 86. This may be done either by stopping and then reversing the towing vehicle or by slowing the towing vehicle and allowing the momentum of the towed vehicle to close the distance between the two vehicles. In this position the pin 62 locks the hitch bar 42 in a fixed position relative to the frame 12 thereby enabling the vehicle 16 to be utilized in the conventional manner to tow the trailed vehicle.

Upon fully extending the hitch bar 42 by moving the towing vehicle 16 forwardly, the opposite ends of the pin 74 engage the curved peripheral edges of the plates 30 and 36 and seat in the notches 76, 78 and 80 thereby enabling the pin 62 to drop through the aperture 68.

The forward end of the angle iron 18 is secured to the frame member 17 in any convenient manner such as by fasteners (not shown) which secure the strap support 90 to the frame member 18, the lower end of this strap support being secured to the rear end of the angle iron 18 by means of a suitable fastener 92. Further, the flange 26 may be provided with a second set of bores 96 for receiving the fasteners 52 whereby the flange 26 will be adapted for securement to mounting flange 44 in adjusted front to rear positions. Finally, the hitch may also be added to tow bars where it is desired to shorten the tow bar in the towing position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A wide-range tow hitch including a frame adapted to be mounted on a first vehicle, a base rotatably supported from said frame for movement about an upstanding axis, a generally horizontal elongated hitch bar slidably mounted on said base for free guided longitudinal reciprocation relative to said base between a retracted position of one end thereof and an extended limit position of said one end and against rotation of said bar relative to said base about an upstanding axis, said one end including means adapted for pivotal connection to a second vehicle, and coacting means carried by said frame and said base and bar operative to automatically releasably lock said base in a predetermined position of rotation and said bar in said retracted position upon rotation of said base to said predetermined position of rotation and movement of said bar to said retracted position, said frame and said bar including coacting means operative to automatically releasably lock said bar and therefore also said base against swinging movement relative to said frame in response to rotation of said base to said predetermined position and subsequent movement of said bar to the extended limit position.

2. The combination of claim 1 wherein said frame and the other end of said bar include coacting means operative to automatically cam said base into said predetermined position in response to movement of said bar to said retracted position while said base is in a position approximating said predetermined position whereby the first-mentioned coacting means may then act to releasably lock said bar and base in said retracted and predetermined positions, respectively.

3. A wide-range tow hitch including a frame adapted to be mounted on a first vehicle, a base rotatably supported from said frame for movement about in upstanding axis, a generally horizontal elongated hitch bar slidably mounted on said base for free guided longitudinal reciprocation relative to said base between a retracted position of one end thereof and an extended limit position of said one end and against rotation of said bar relative to said base about an upstanding axis, said one end including means adapted for pivotal connection to a second vehicle, coacting means carried by said frame and said base and bar operative to automatically releasably lock said base in a predetermined position of rotation and said bar in said retracted position upon rotation of said base to said predetermined position of rotation and movement of said bar to said retracted position, said frame and the other end of said bar including coacting means operative to automatically cam said base into said predetermined position in response to movement of said bar to said retracted position while said base is in a position approximating said predetermined position whereby the first-mentioned coacting means may then act to releasably lock said bar and base in said retracted and predetermined positions, respectively.

4. A wide-range tow hitch including a frame adapted to be mounted on a first vehicle, a base rotatably supported from said frame for movement about an upstanding axis, a generally horizontal elongated hitch bar slidably mounted on said base for free guided longitudinal reciprocation relative to said base between a retracted position of one end thereof and an extended limit position of said one end and against rotation of said bar relative to said base about an upstanding axis, said one end including means adapted for pivotal connection to a second vehicle, coacting means carried by said frame and said base and bar operative to automatically releasably lock said base in a predetermined position of rotation and said bar in said retracted position upon rotation of said base to said predetermined position of rotation and movement of said bar to said retracted position, said bar also being shiftable relative to said base into a fully retracted position, said frame and said base and bar also including coacting means operative to releasably lock said base in said predetermined position and said bar in a fully retracted position.

5. A wide-range tow hitch including a frame adapted to be mounted on a first vehicle, a base rotatably supported from said frame for movement about an upstanding axis, a generally horizontal elongated hitch bar slidably mounted on said base for guided longitudinal reciprocation relative to said base between a retracted position of one end thereof and an extended limit position of said one end, said one end including means adapted for pivotal connection to a second vehicle, coacting means carried by said frame and said base and bar for automatically releasably locking said base in a predetermined position of rotation and said bar in said retracted position upon rotation of said base to said predetermined position of rotation and movement of said bar to said retracted position, said coacting means including means for sequentially locking said base in said predetermined position and said bar in said retracted position, said frame and said bar including coacting means operative to automatically releasably lock said bar and therefore also said base against swinging movement relative to said frame in response to rotation of said base to said predetermined position and subsequent movement of said bar to the extended limit position.

6. A wide-range tow hitch including a frame adapted to be mounted on a first vehicle, a base rotatably supported from said frame for movement about an upstanding axis, a generally horizontal elongated hitch bar slidably mounted on said base for guided longitudinal reciprocation relative to said base between a retracted position of one end thereof and an extended limit position of said one end, said one end including means adapted for pivotal connection to a second vehicle, and coacting means carried by said frame and said base and bar for automatically releasably locking said base in a predetermined position of rotation and said bar in said retracted position upon rotation of said base to said predetermined position of rotation and movement of said bar to said retracted position, said coacting means including means for sequentially locking said base in said predetermined position and said bar in said retracted position, said frame and the other end of said bar including coacting means operative to automatically cam said base into said predetermined position in response to movement of said bar to said retracted position while said base is in a position approximating said predetermined position whereby the first-mentioned coacting means may then act to releasably lock said bar and base in said retracted and predetermined positions, respectively.

References Cited by the Examiner

UNITED STATES PATENTS

| 2,474,296 | 6/1928 | Wiltsee | 280—482 X |
| 2,973,971 | 3/1961 | Oddson | 280—478 |
| 2,988,383 | 6/1961 | Carson | 280—478 |
| 3,083,986 | 4/1963 | Moody et al. | 280—482 X |

FOREIGN PATENTS

| 388,628 | 3/1933 | Great Britain. |

LEO FRIAGLIA, *Primary Examiner.*

A. HARRY LEVY, *Examiner.*

R. C. PODWIL, *Assistant Examiner.*